June 19, 1928.

R. M. EDINGTON

POULTRY DRINKING FOUNTAIN

Filed March 10, 1927

Inventor

Robert M. Edington,

By [signature] Attorney

June 19, 1928.
R. M. EDINGTON
POULTRY DRINKING FOUNTAIN
Filed March 10, 1927   2 Sheets-Sheet 2
1,673,814
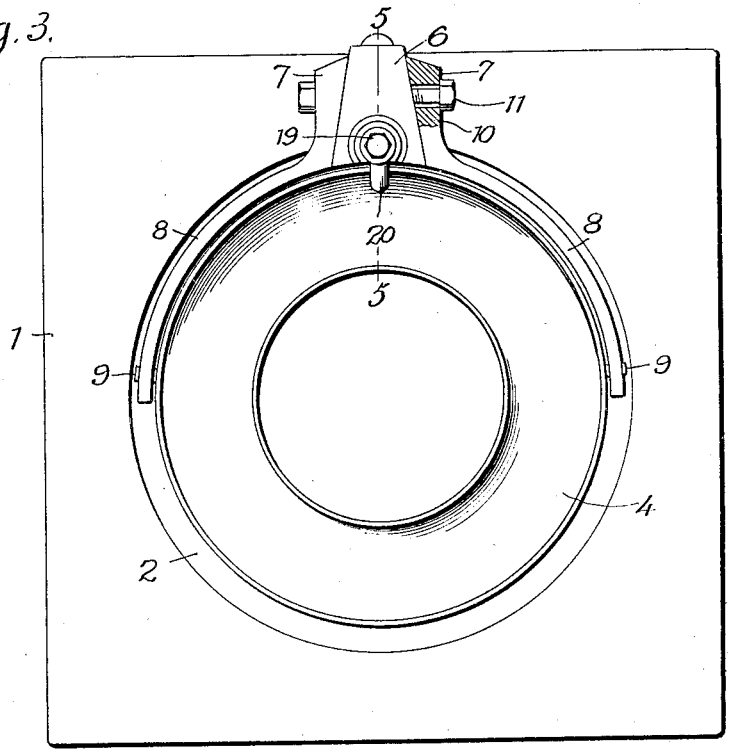
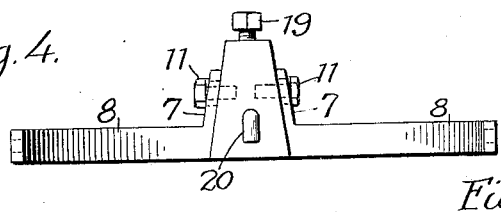
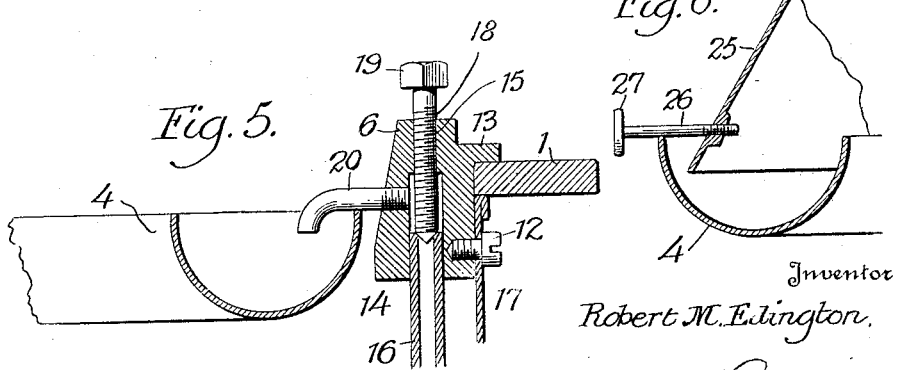
Inventor
Robert M. Edington,
By
Attorney Patented June 19, 1928.

1,673,814

UNITED STATES PATENT OFFICE.

ROBERT M. EDINGTON, OF VINELAND, NEW JERSEY.

POULTRY DRINKING FOUNTAIN.

Application filed March 10, 1927. Serial No. 174,279.

This invention relates to poultry drinking fountains of that general type embodying a platform on which the fowls stand while drinking, a pan or reservoir to hold the drinking water, a water supplying means for maintaining the water in the pan or trough at a predetermined level, and suitable means for heating the water during cold weather.

The main object of the invention is to provide a drinking fountain of this character in which the pan or trough is tiltably mounted so that it may be adjusted to a position to allow it to be readily cleaned, and in which the water supplying device or means may, if desired, be employed as a stop for limiting the tilting motion of the trough or pan in one direction and maintaining it in its normal service position.

A further object of the invention is to provide novel cooperative means for mounting the water supplying device and the pan or trough in a simple and inexpensive manner, and which admits of adjustment of the trough to properly level it for use and to control its tilting motions.

A still further object of the invention is to provide a poultry drinking fountain adapted to be used by fowl of different sizes, and which is of highly efficient and sanitary character.

The invention consists of the features of construction, combination and arrangement of parts, hereinafter fully described and claimed, reference being had to the accompanying drawings, in which:—

Figure 3 is a top plan view with the cone shield or guard omitted.

Figure 4 is a view in elevation of the combined supporting bracket and water supply device per se, looking toward the inner side thereof.

Figure 5 is an enlarged detail section taken on the line 5—5 of Figure 3.

Figure 6 is a detail view through one side of the pan or trough and the cone shield, showing one of the devices for supporting and adjusting the shield.

Figure 1:
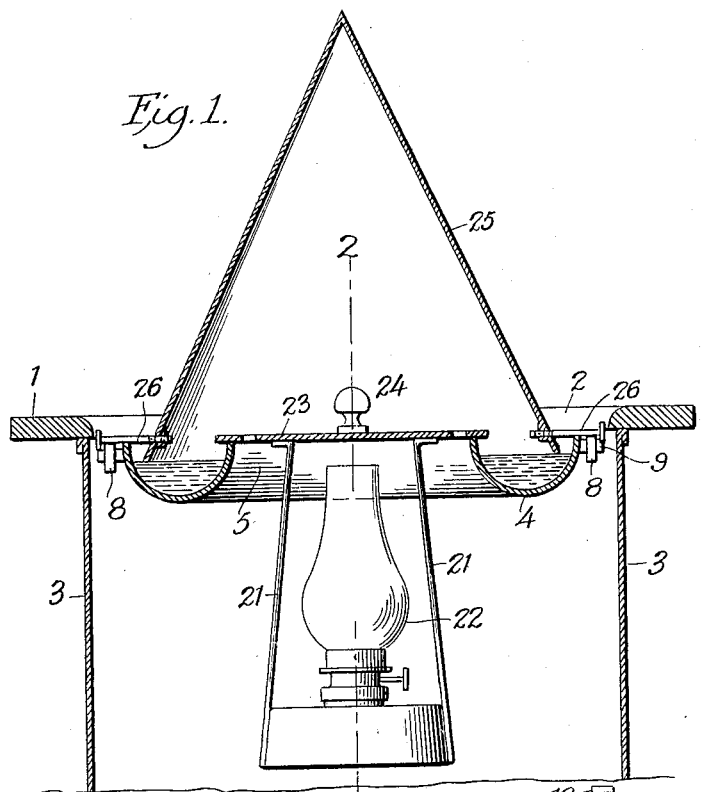
Figure 1 is a vertical transverse section through a poultry drinking fountain embodying my invention.
Figure 2:
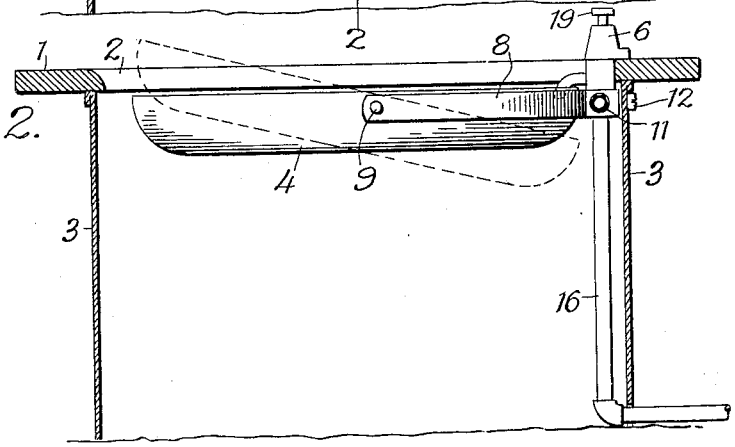
Figure 2 is a vertical section through the casing platform, and taken on line 2—2 of Figure 1, showing in full and dotted lines the pan or trough in normal position and tilted to a certain degree out of normal position.

In the practical embodiment of the invention as herein disclosed, 1 designates a supporting platform on which the fowl stand while drinking. This platform may be of square, round or other suitable outline form, and is provided with a central opening 2 of circular or other desired form, but preferably of circular form. This opening 2 communicates with the upper end of a casing 3 on the upper edge of which the platform 1 rests, and whereby said platform is supported. This casing 3 is preferably made of sheet metal, in the form of a cylinder of somewhat greater diameter than the opening 2, and said casing may be either open or closed at its base. As shown in the present instance the casing is open at its base and is designed to rest upon the ground or floor and forms an enclosure for the heating means and a trap to catch the overflow water from the pan or trough, as hereinafter fully described.

Arranged in the upper portion of the casing 3 just below the level of the bottom of the platform 1 and in line with the opening 2 so as to be exposed therethrough is a pan or trough 4 to hold a supply of drinking water. This pan or trough is of annular form and of U-shape or channeled cross-section and provided with a central opening 5. The trough is supported by a bracket comprising a central bracket member 6 and a pair of side bracket members 7, arranged on opposite sides of said bracket member 6, which side bracket members 7 are provided with curved arms 8 surrounding the trough on one side of its center and to the free ends of which the trough is pivotally connected, as indicated at 9. The bracket members 7 are provided with slots 10 receiving screw bolts 11 which enter the bracket member 6 and adjustably connect the bracket members 7 thereto, the construction being such that the bracket members 7 may be adjusted on the bracket member 6 to properly level the trough 4 for the purpose of disposing the mouth of the water containing channel at a proper height with respect to the opening 2 as well as to ensure proper alinement of the pivots 9 for a designed free and easy tilting motion of the trough.

The bracket member 6 extends through and above and below the opening 2 at one side of the platform 1 and bears against the inner wall of said opening. Below the platform the said bracket member 6 is formed with a threaded recess to receive a fastening screw 12 which passes through the adjacent portion of the casing 3 and secures the bracket structure thereto. Above the platform 1 the bracket member is provided with a flange or lug 13 which extends over upon the upper surface of the platform and operates as a stay for the bracket and also as a retaining member to hold the platform in place and from shifting on the upper edge of the casing 3.

The bracket member 6 also serves as the body of a water supply faucet or valve, and is provided with a central vertical bore comprising an enlarged lower portion 14 and an upper relatively smaller internally threaded portion 15. The bore portion 14 receives the upper end of a water supply pipe 16 which may be threaded or otherwise suitably secured therein, and which pipe terminates at its upper end below the top of the bore portion 14 and is provided with a conical valve seat 17. A valve member 18 fits in the bore portion 15 and is threaded for adjustable engagement therewith and is provided with a conical lower end portion to engage the valve seat 17 and at its upper end with a head, knob or finger-piece 19. Communicating at its inner end with the upper end of the bore portion 14 is a discharge nozzle 20, which is suitably secured in the bracket member 6 and projects outwardly therefrom so as to overhang the adjacent portion of the mouth of the trough 4 and is provided with a downturned end projecting into said trough.

In practice, the platform 1, by making the casing 3 of the proper height, may be disposed at any convenient elevation with relation to the ground or floor or other surface so to allow the poultry to have convenient access thereto, the platform providing a support on which the fowl may stand and the trough being arranged so that the fowl may conveniently dip their bills down into the water in the trough through the opening 2. By the adjustable connection of the bracket members 7 with the bracket member 6 the upper surface of the trough may be arranged at such level with respect to the level of the platform as to enable the trough to be reached by chicks or partly grown or full grown fowl of all sizes. When the device is in operation the valve 18 is adjusted to allow water to flow through the nozzle 20 into the trough at a desired feed rate, sufficient to keep the trough full to an overflow point without undue waste, the surplus water flowing over the outer rim edge of the trough into the space bounded by the casing 3 and carrying with it all deposited refuse, whereby the water in the trough will always be kept in a perfectly uncontaminated and sanitary condition. The valve 18 may also be adjusted to such a degree as to provide for a full flow of water to the trough for a flushing action, whenever it is desired to give a flush wash-out from time to time. The pivotal mounting of the trough on the bracket arms 8 also adapts the trough to be swung to a vertical position to permit dumping of its contents and scouring or brush washing of the trough for a thorough cleansing action whenever desired, in a convenient manner and without the necessity of removing the trough from its supports. In order to simplify the construction, the trough is so mounted as to dispose the pivot points 9 just a little to one side of the center of the trough, that is, somewhat closer to that side of the trough facing the nozzle 20 than to the opposite side of the trough. The side of the trough remote from the water discharge device will, therefore be of slightly preponderating weight, under which the trough would normally tend to tilt to a vertical position. By this mode of mounting of the trough the side thereof of minor weight, which is closer to the nozzle 20, is held in contact at its rim edge with the underside of the nozzle, so that the nozzle will serve as a gage to indicate the working level of the trough and also as a stop device to limit the tilting motion of the trough and maintain it at its working level. The heavier side of the trough may, however, swing up from the opening 2 and the lighter side of the trough below the water discharge nozzle for a dumping action and to permit thorough cleansing of the trough, as previously described.

The casing 3 serves to retain and prevent water flowing or splashing from the trough from being scattered about. It also serves to retain any particles of food left in the water by the birds and to prevent the same from being scattered about. In practice the casing may communicate at its base with a suitable drain so that all overflow waters and impurities will be carried off, thus keeping the floor and litter dry. The casing furthermore serves as an enclosure for a heating device 21 which may be of any suitable character, but which is herein shown in the form of an ordinary oil lamp provided with a chimney 22 which is secured to a plate or disk 23 closing the opening 5 in the trough and of somewhat greater diameter than said opening and adapted to rest upon the inner rim edge of the trough to support and center the heating device with respect to said opening. The plate or head 23 is provided with a knob or other finger-piece 24 by which the heater may be lifted and transported, and which adapts the heater to be raised and withdrawn through the opening 5 and lowered downward through said opening for use. This disk 23 is perforated to permit flow of the heat and products of combustion upward from the lamp and to permit of proper ventilation. The arrangement of the heater is such that by conduction it will heat the trough 4 and by radiation heat the interior of the casing 3 and the whole of the bottom of the trough and its contents, so that, during cold weather, the water in the trough may be tempered and kept at any suitable temperature.

A guard or shield 25 of conical form is provided to prevent the birds from passing from the platform onto the disk 23 and from stepping into the trough. This guard is arranged to overhang the central opening 5 and more or less of the trough and dips at its lower edge into the trough channel. For the purpose of supporting the shield in position adjustable supporting screws 26 are provided spaced around the base of the shield, which screws are in threaded engagement with the shield and designed to rest upon the outer rim edge of the trough, said screws having outer headed ends or finger-pieces 27 extending beyond the trough and providing for an adjustment of the screws without removing the trough to properly center it with relation to the trough. These screws also provide a means whereby the trough may be removed in a ready and convenient manner. By the use of shields of several different sizes or diameters at their bases, the extent to which the channel of the trough is exposed may be varied as desired, to adapt one and the same size of trough for the use of chicks as well as partly and full grown birds, shields of large size being employed when the trough is to be used by chicks in order to diminish the effective size of the mouth or opening of the trough to a degree allowing the chicks to have convenient access to the water while preventing them from stepping into the trough or falling in.

From the foregoing description, taken in connection with the drawings, it will be seen that my invention provides a poultry drinking fountain which is simple of construction and adapted to automatically supply a constant flow of water in such manner as to keep the contained drinking water pure and wholesome, while allowing the water to be tempered to any degree. Also it will be seen that the invention provides a novel and simplified mode of mounting the parts, including a tilting trough, which permits thorough cleansing of the trough whenever desired, as well as ready assemblage and disassemblage of the parts for use or storage or other purposes. Other conveniences and advantages will be apparent from the disclosure to those versed in the art without a further and extended description.

Having thus fully described my invention, I claim:—

1. A poultry drinking fountain including a platform having an opening therein, a supporting bracket, a tilting trough pivoted to the bracket, a water discharge nozzle carried by the bracket and arranged to be engaged by the trough and to limit the swinging motion thereof in one direction, and means controlling the flow of water to said nozzle.

2. A poultry drinking fountain including a platform having an opening therein, a supporting bracket having arms extending into said opening, a channeled trough pivotally mounted on said arms at one side of its center, a water supply nozzle carried by the bracket and arranged to be engaged by the trough and to limit the tilting movement thereof in one direction, and means carried by the bracket for controlling the flow of water to the nozzle.

3. A poultry drinking fountain including a platform having an opening therein, a supporting bracket comprising a central member and side members adjustably connected therewith, said side members being provided with supporting arms, a tilting trough pivotally mounted on said supporting arms of the bracket, a discharge nozzle carried by the central bracket member, and means governing the flow of water to said nozzle.

4. A poultry drinking fountain comprising an enclosing casing, a platform resting on said casing and having an opening therein, in, a bracket supported by the casing, a trough pivotally mounted upon said bracket, a water discharge nozzle carried by the bracket, a water supply pipe leading to the bracket, and a valve carried by the bracket and controlling the flow of water from the pipe to the nozzle.

5. A poultry drinking fountain comprising a casing, a platform resting on the casing and having an opening therein, a bracket secured to the casing and having a retaining projection engaging the platform, said bracket being provided with supporting arms, a tilting trough pivotally mounted on said arms, a water discharge nozzle carried by the bracket, and a valve carried by the bracket and controlling the flow of water to the nozzle.

6. A poultry drinking fountain including a platform having an opening therein, an annular channeled trough exposed at said opening, a cone shield dipping at its lower edge into the channel of the trough, and supports carried by said shield and adjustably connected therewith and engaging the rim of the trough.

In testimony whereof I affix my signature.

ROBERT M. EDINGTON.